United States Patent [19]
Evers et al.

[11] Patent Number: 5,301,805
[45] Date of Patent: Apr. 12, 1994

[54] REUSABLE HARD-PACK CIGARETTE CASE AND BLANK THEREFOR

[75] Inventors: Donald H. Evers, Richmond; William C. Harris, Jr., Midlothian, both of Va.

[73] Assignee: Philip Morris Incorporated, New York, N.Y.

[21] Appl. No.: 926,826

[22] Filed: Aug. 7, 1992

[51] Int. Cl.$^5$ .................................. B65D 85/10
[52] U.S. Cl. ........................... 206/273; 206/268; 229/87.13
[58] Field of Search .............. 206/242, 265, 268, 271, 206/273, 275; 229/87.13

[56] References Cited

U.S. PATENT DOCUMENTS

| | | |
|---|---|---|
| 381,889 | 4/1888 | Scott . |
| 512,011 | 1/1894 | Colgan . |
| 1,523,039 | 1/1925 | Reed . |
| 1,928,889 | 10/1933 | Guyer . |
| 1,994,540 | 3/1935 | Spiking . |
| 2,901,097 | 8/1959 | Tamarin . |
| 2,902,201 | 9/1959 | Engblom . |
| 3,079,064 | 2/1963 | Ringler ............... 229/87.13 X |
| 3,107,008 | 10/1963 | Margulies . |
| 3,108,711 | 10/1963 | Anton ................... 206/273 X |
| 3,282,465 | 11/1966 | Davis . |
| 3,454,151 | 7/1969 | Plaskan . |
| 4,303,154 | 12/1981 | Hicks . |

FOREIGN PATENT DOCUMENTS 89565  6/1921  Switzerland .

Primary Examiner—Bryon P. Gehman
Attorney, Agent, or Firm—Kevin B. Osborne; James E. Schardt; Charles E. B. Glenn

[57] ABSTRACT

A limited-life reusable hard pack for encasing a soft pack of cigarette. The reusable hard pack permits easy access to the cigarette by the feature of a sliceable interior wall attached to a pivotable bottom wall that when moved relative to the exterior walls of the hard pack pushes the soft pack upward and beyond the top of the hard pack. An overhang on a top wall extends across and beyond one side wall to prevent the bottom wall from pivoting downward, beyond the bottom plane of the hard pack. The opposite side of the top wall leaves a gap through which cigarette may be removed without opening to top closure. One such hard pack is collapsed and inserted into a standard ten-pack carton.

75 Claims, 13 Drawing Sheets

REUSABLE HARD-PACK CIGARETTE CASE AND BLANK THEREFOR

BACKGROUND OF THE INVENTION

This invention relates to the field of cigarette packages. More particularly, this invention relates to a limited-life reusable hard-pack cigarette case into which soft-pack cigarette containers may be inserted.

Cigarettes are normally sold in either hard or soft packs of twenty to twenty-five cigarettes. These packs are also sold in ten-pack cartons, and sometimes in five-pack half-cartons. Both hard and soft packs typically cover an inner foil lining, which protects the flavor of the tobacco.

Hard packs have the advantage that they are more sturdy than soft packs, protecting the cigarettes from being crushed when a pack is placed in a consumer's purse, or pocket, rolled up shirt sleeve, or when a heavy object is inadvertently placed on top of the pack, such as on an automobile seat. In addition, hard packs provide easier access to the enclosed cigarettes than soft packs by having recessed front walls adjacent to the top closure.

Hard packs, however, cost more to make than comparable soft packs. In addition, hard packs require more material than soft packs, raising environmental concerns of waste, both in use of resources and in disposing of used packs.

There is a need for a system that couples the advantages of hard packs—both in product protection and ease of access to the cigarettes—that costs less and is less wasteful of environmental resources.

SUMMARY OF THE INVENTION

It is the object of the present invention to provide a limited-life, reusable hard-pack case for enclosing foil or soft-pack cigarette containers. One of these reusable packs may be inserted into a standard ten-pack carton along with ten standard soft packs or foil packs. The consumer inserts a foil or soft pack into the reusable pack, then discards the inner foil or soft pack when finished, retaining the reusable pack for a fresh foil or soft pack. The consumer may then discard the reusable case after the last soft pack has been smoked.

It is another object of this invention to provide a modified top closure having a tuck portion to enable the consumer to readily open the top closure, remove the used foil or soft pack, insert a fresh foil or soft pack, and reclose the top closure.

It is a further object of this invention to provide a top wall that only covers a portion of the top of the encased foil or soft pack so that the consumer may remove individual cigarettes through the opening in the top wall without removing the tuck portion and opening the top closure. This is preferably accomplished by a top wall that spans about two-thirds of the distance across the top of the reusable pack, leaving one-third of the top of the reusable pack open, exposing that area of the inner foil or soft pack.

It is yet a further object of this invention to provide a means for raising the position of the encased foil of soft pack relative to the top of the reusable case so that the consumer may more easily obtain access to and tear open the exterior wrapping of the encased foil or soft pack.

It is another object of the invention to provide for an extension of the top wall to prevent the bottom wall from falling downward, in the opposite direction that the bottom wall pivots to provide easy access to the encased cigarettes. This extension of the top wall forms an overhang beyond the plane defined by the adjacent side wall. This feature helps to keep the integrity of the cigarette pack.

It is yet a further object of the invention to provide a cigarette carton in which minimal graphics and printing are required on the cigarette packs. This is preferably accomplished by printing the brand logo, name and other graphics onto only one of the cigarette packs resulting both in cost savings and in reducing waste.

These and other objects are preferably accomplished by a single blank, preferably of paperboard, that is folded along scored or fold lines to form a reusable hard pack having a front wall, a rear wall, two side walls, a bottom wall and a top closure having a top wall and a tuck portion. The top closure is connected to the bottom wall by an interior wall such that when the top closure is pulled upward, away from the bottom wall, the bottom wall is raised in the general direction of the top closure relative to the position of the front, rear and side walls, thereby raising the level of the inner foil or soft pack to enable easy access by the consumer to open the foil or soft pack wrapper.

Preferably, the interior wall is perpendicularly attached to the bottom wall and top wall of the top closure, and is parallel to, abutted against and of the same size and shape as the rear wall. In this embodiment, when the bottom wall is in the raised position, it is pivoted along the edge of the bottom wall that is perpendicularly attached to the front wall, moving the bottom wall out of its perpendicular plane with an angle of less than 90° relative to the front wall. The opposite edge of the bottom wall, which is perpendicularly attached to the interior wall, is moved out of its perpendicular plane with an angle of greater than 90° relative to the interior wall. The sum of the resultant angles between the bottom wall and each of the front wall and interior wall remains 180°.

As the bottom wall is moved out of its perpendicular plane to the front and interior walls, it pushes the encased foil or soft pack upward and beyond the top of the free edges of the front, rear and side walls (adjacent to the top closure). This provides the easy access to the consumer for opening the foil or soft pack wrapping.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout and in which.

DETAILED DESCRIPTION OF THE INVENTION

Figure 1:
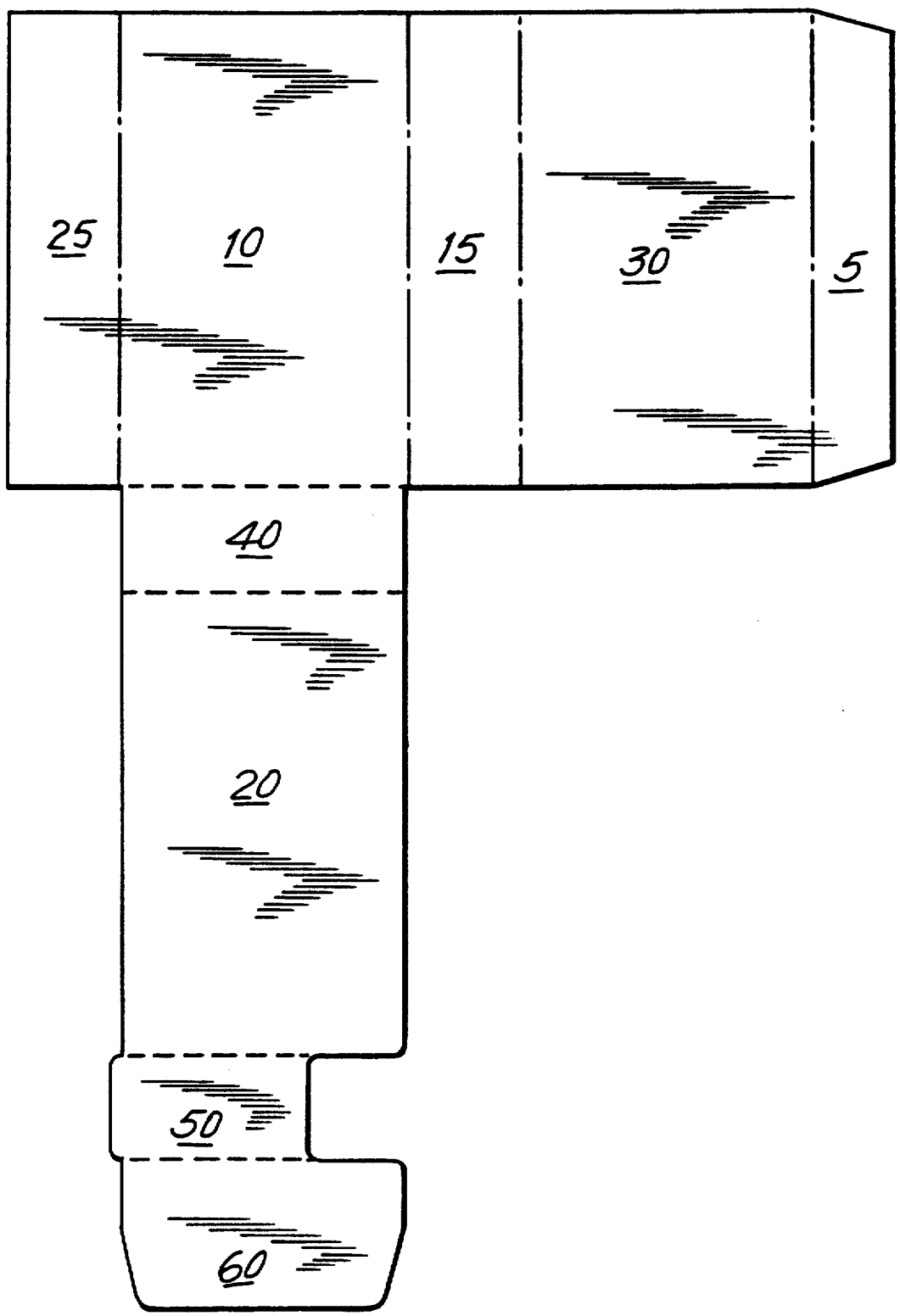
FIG. 1 shows a blank for the preferred embodiment of the invention, with the interior surface facing upward.

FIG. 1 shows the blank for forming the preferred embodiment of the invention. The alternating long and short dashed lines are scored fold lines that will be folded into place, and the short dashed lines are perforated scored fold lines designed to be repeatedly pivoted over the limited life of the reusable hard pack without breaking. Panels connected by short dashed lines will be referred to as being pivotably attached to each other; those connected by alternating long and short dashed lines will be referred to as being foldably attached.

The blank is preferably made of paperboard, and is folded upward, out of plane and toward the viewer of FIG. 1, showing the interior surfaces of each of the panels such that when formed into a pack the surfaces will in general not be seen by the consumer.

The blank consists of front wall 10; right side wall 25, which is foldably attached to front wall 10; left side wall 15, which is foldably attached to front wall 10 opposite of and of substantially the same size and shape as right side wall 25; rear wall 30, which is foldably attached to left side wall 15 opposite of and of substantially the same size and shape as front wall 10; insert side wall 5, which is foldably attached to rear wall 30 opposite of and smaller than left side wall 15; bottom wall 40, which is pivotably attached to front wall 10; interior wall 20, which is pivotably attached to bottom wall 40 opposite of and slightly smaller than front wall 10; top wall 50, which is pivotably attached to interior wall 20 opposite of bottom wall 40; and tuck portion 60, which is pivotably attached to top wall 50 opposite of interior wall 20. Top wall 50 and tuck portion 60 will be collectively referred to as the top closure.

For purposes of providing reference only, the various panels are referred to as being front, rear, top, bottom, left side and right side walls. This is based on the perspective of the formed reusable hard pack shown in FIGS. 7–8. However, the actual orientation of the formed reusable hard pack may be any possible orientation. For example, right side wall 25 may be oriented as the bottom of a reusable hard pack that opens from the side.

Figure 2:
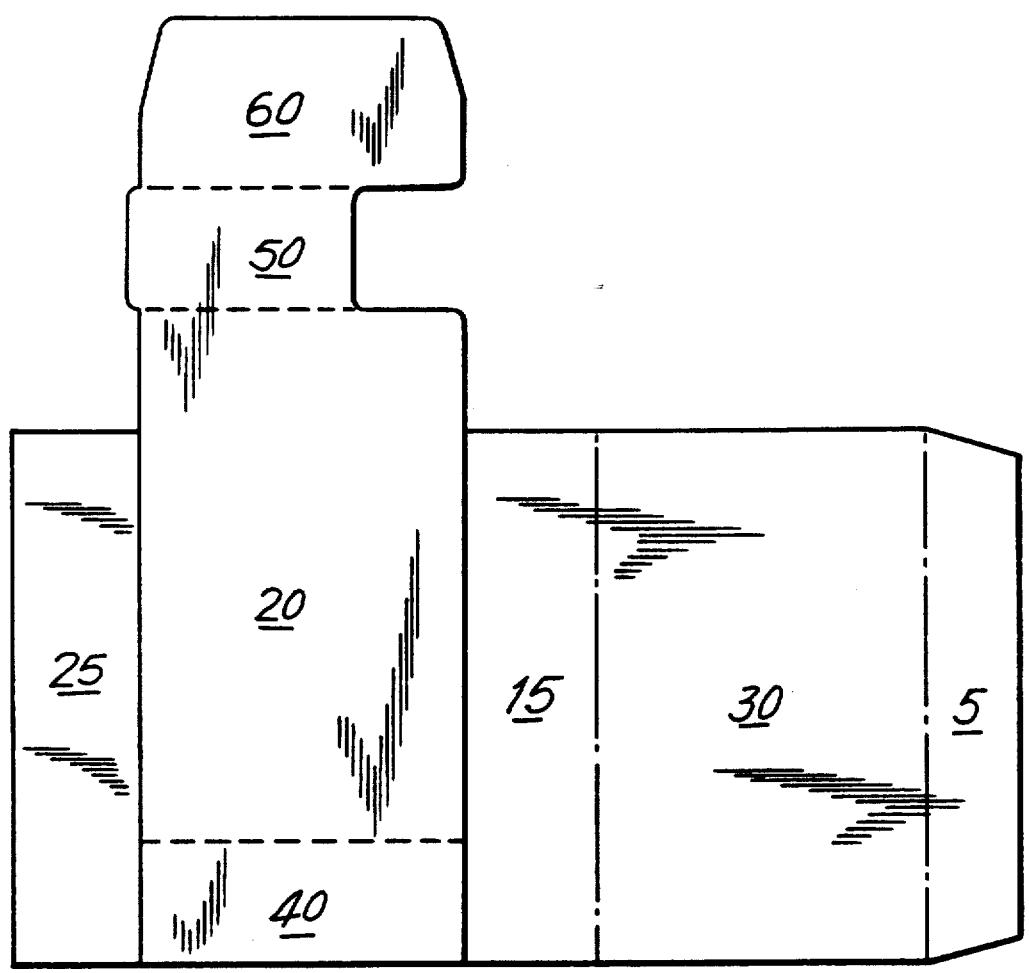
FIG. 2 shows the first step in forming the blank of FIG. 1 into a reusable hard pack by folding the coplanar bottom wall, interior wall and top closure against the front wall.

The first step in forming the blank of FIG. 1 into a reusable hard pack entails folding bottom wall 40 along the pivot line between bottom wall 40 and front wall 10 so that bottom wall 40 is rests against front wall 10, as shown in FIG. 2. Once folded, the blank remains in a substantially 2-dimensional configuration, with bottom wall 40, interior wall 20, top wall 50 and tuck portion 60 coplanar.

Figure 3:
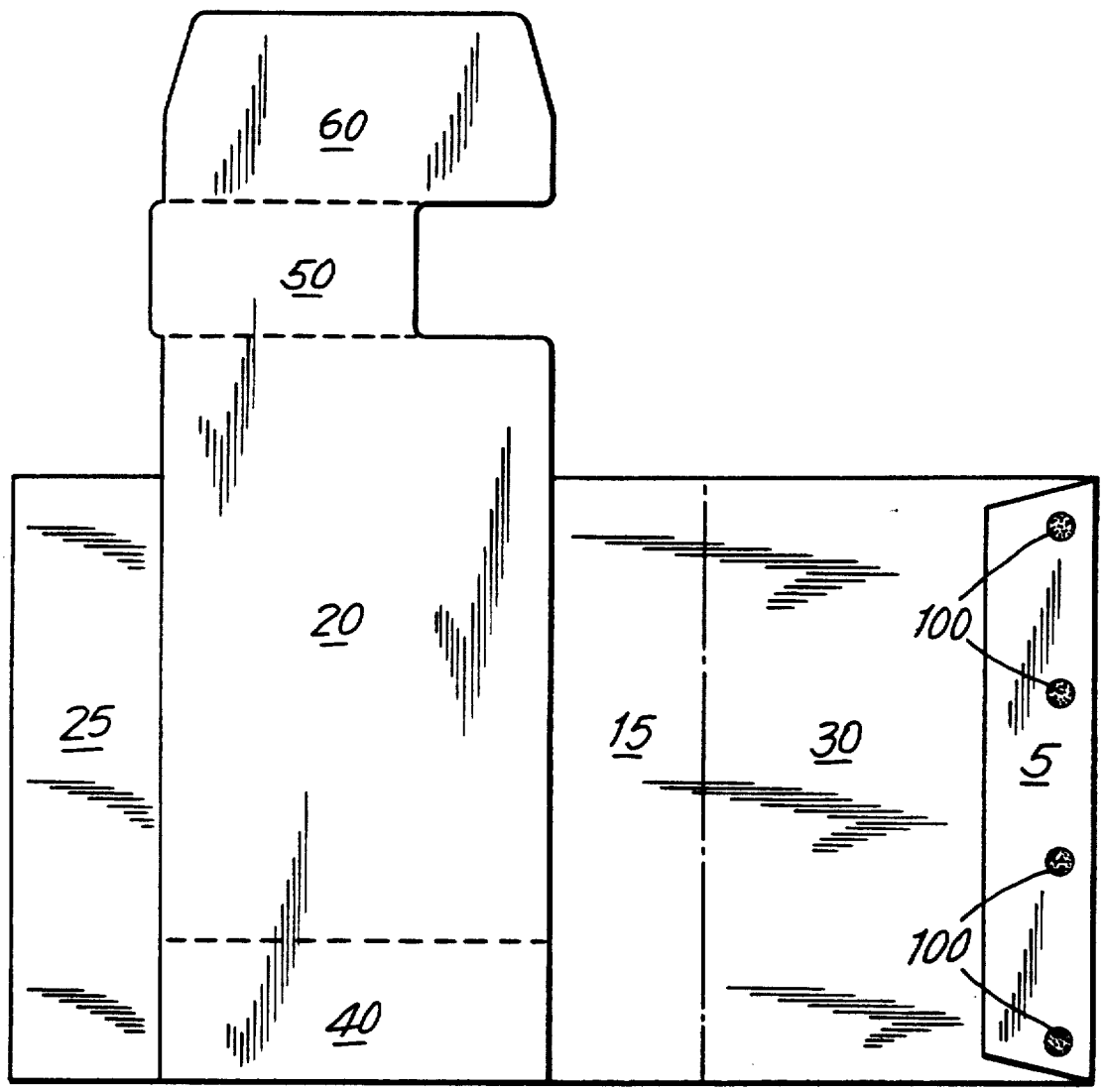
FIG. 3 shows the second step in forming the reusable hard pack in which the insert side wall is folded back against the rear wall and to which glue is applied to the exposed surface.

The second step in forming the reusable hard pack involves folding insert side wall 5 back against rear wall 30 so that it is parallel and abutted against rear wall 30, as shown in FIG. 3. Glue points 100 are then applied along the exposed surface of insert side wall 5. While FIG. 3 shows glue spots 100 being applied in a line on insert side wall 5, those skilled in the art will appreciate that the glue may instead be applied to right side wall 25, or to both walls. Other securing means known in the art may be employed to secure right side wall 25 to insert side wall 5, such as a pre-applied adhesive or heat-sealed poly coating. Regardless of which securing means is employed, the blank remains in a substantially 2-dimensional configuration.

Figure 4:
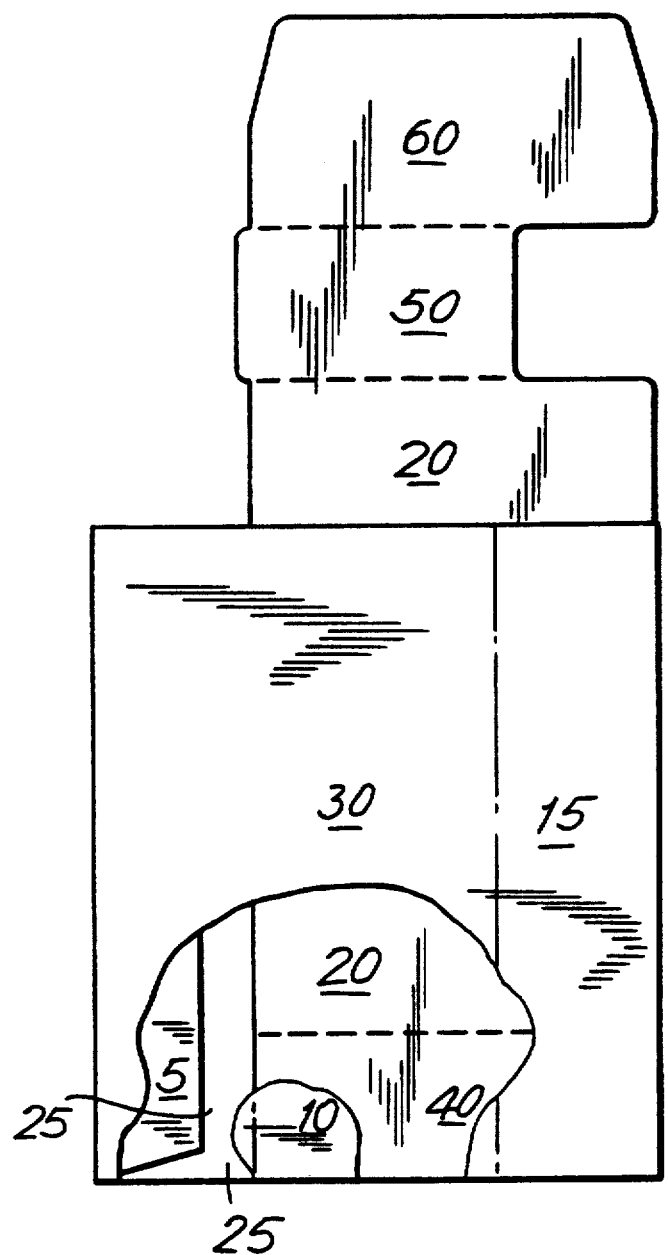
FIG. 4 shows the three layers of the third step in forming the reusable hard pack in which the coplanar rear wall and insert side wall are folded back against the front wall and the insert side wall is secured to the adjacent side wall.

The third and final step in forming the reusable hard pack is to fold left side wall 15 along the fold line between it and front wall 10 so that it is rests against bottom wall 40 and interior wall 20, as shown in FIG. 4. Rear wall 30 remains coplanar with left side wall 15 during this step, allowing the glue points 100 on insert side wall 5 to come in contact with right side wall 25. In this way, right side wall 25 is secured to insert side wall 5. Note that all fold and pivot lines are mobile, capable of folding or pivoting.

FIG. 4 shows the three layers of the collapsed or substantially two-dimensional configuration of the formed reusable hard pack. The top layer includes rear wall 30 and left side wall 15, which are both coplanar and rectangular in shape.

The middle layer consists of insert side wall 5, interior wall 20 and bottom wall 40. The portion of interior wall 20 remote from bottom wall 40 is seen extending beyond the boundary of the rear wall 30 and left side wall 15, as are top wall 50 and tuck portion 60, which are coplanar with interior wall 20 and bottom wall 40.

There is a gap in this middle layer between insert side wall 5 and interior wall 20 and insert side wall 5. Right side wall 25 is visible in the layer beneath that gap. In addition to right side wall 25, the lower layer also contains front wall 10.

The reusable hard pack as shown in FIG. 4 is preferably left in its substantially two-dimensional configuration and inserted into and on the side of a standard cigarette carton containing ten foil or soft packs. These foil or soft packs may be made from any standard material, such as aluminum foil, paper, or a plastic or metalized wrapping material.

The collapsed reusable hard pack is preferably inserted into a ten-pack carton along a vertical plane to allow the carton to be opened and the enclosed foil or soft packs to be tax-stamped in the conventional manner. The carton is then reclosed and eventually sold to a consumer. Alternately, the reuseable hard pack may be offered separately as a premium along with a carton of soft packs.

In conventional tax-stamping machines, ten cigarette packs are encased in a 2×5-carton so that the top closures of the carton are folded back along the exterior walls of the carton, exposing the bottoms of the cigarette packs. The collapsed reusable hard pack must therefore fit either between or on one of the sides of the two rows of five cigarette packs so as not to obstruct the exposed ends of the cigarette packs during tax stamping.

An example of a standard tax-stamping machine is model FUSON, manufactured by Meyercord, of 365 East North Avenue, Carol Stream, Ill. 60187.

Figure 5:
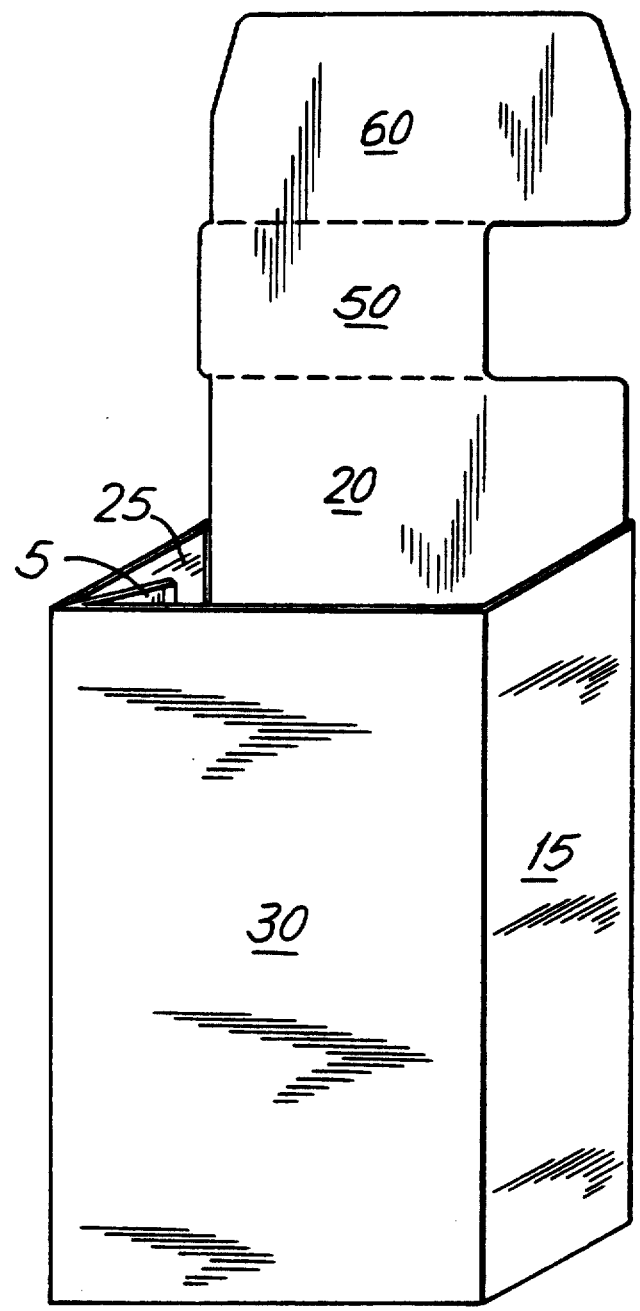
FIG. 5 is a rear perspective view of the flattened reusable hard pack of FIG. 4 in a partially expanded configuration with each of the side walls perpendicular to each of the front and rear walls, but with the bottom wall, interior wall and top closure coplanar.

The consumer then transforms the two-dimensional reusable hard pack shown in FIG. 4 into the final formed configuration in two steps. In the first step, the plane defined by rear wall 30 is moved away from the plane defined by interior wall 20 such that rear wall 30 is perpendicular to left side wall 15 and right side wall 25, which are each in turn perpendicular to interior wall 20 and front wall 10, as shown in FIG. 5. Interior wall 20 remains generally coplanar with bottom wall 40 and the top closure, and rests against front wall 10.

Figure 6:
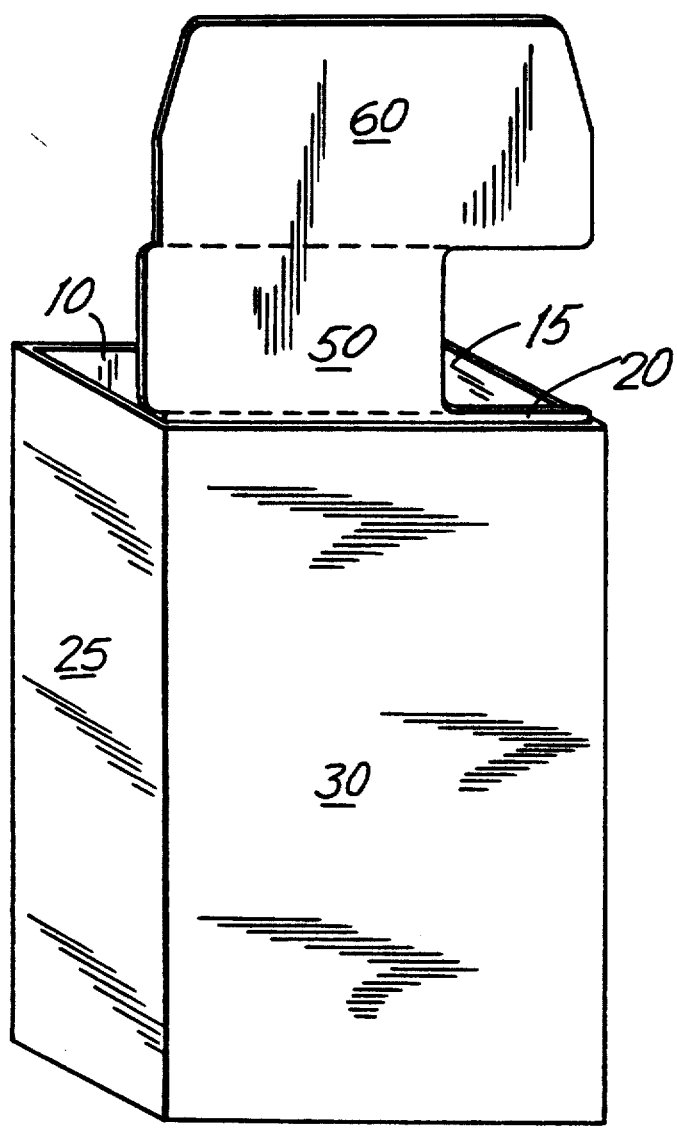
FIG. 6 is a rear perspective view of the preferred embodiment of the reusable hard pack in its fully expanded configuration with the bottom wall perpendicular to the front, rear and interior walls and into which a foil or soft pack may be inserted.

The second step entails folding bottom wall 40 into place along its pivot lines so that it is generally perpendicular to front wall 10 and interior wall 20, as shown in FIG. 6. Interior wall 20 then rests against rear wall 30 instead of front wall 10. This is the final three-dimensional configuration of the formed reusable hard pack, which is ready for insertion of a foil or soft pack by the consumer.

Figure 7:
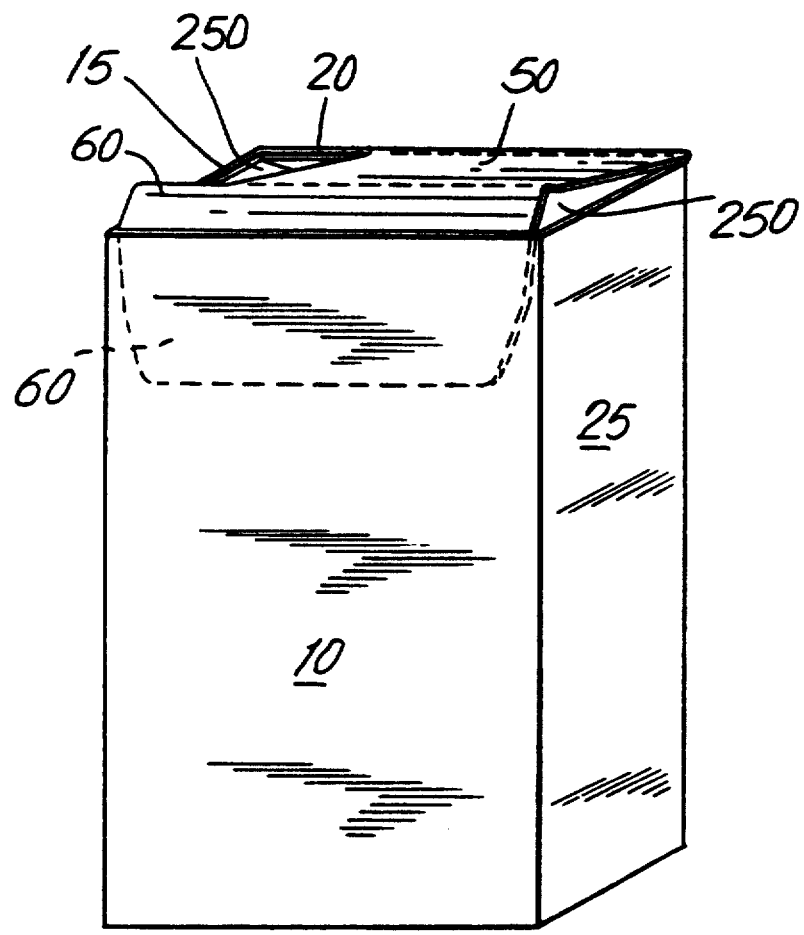
FIG. 7 is a front perspective view of the formed reusable hard pack of FIG. 6 containing a foil or soft pack, and with the top closure partially closed.

After the consumer inserts a foil or soft pack into the reusable hard pack, the top closure may be closed as shown in FIG. 7. Top wall 50 is folded along its pivot line with interior wall 20 toward front wall 10, and tuck portion 60 is simultaneously folded along its pivot line so that its free end is inserted into the reusable hard pack along the interior surface of front wall 10 and between front wall 10 and the encased foil or soft pack.

Figure 8:
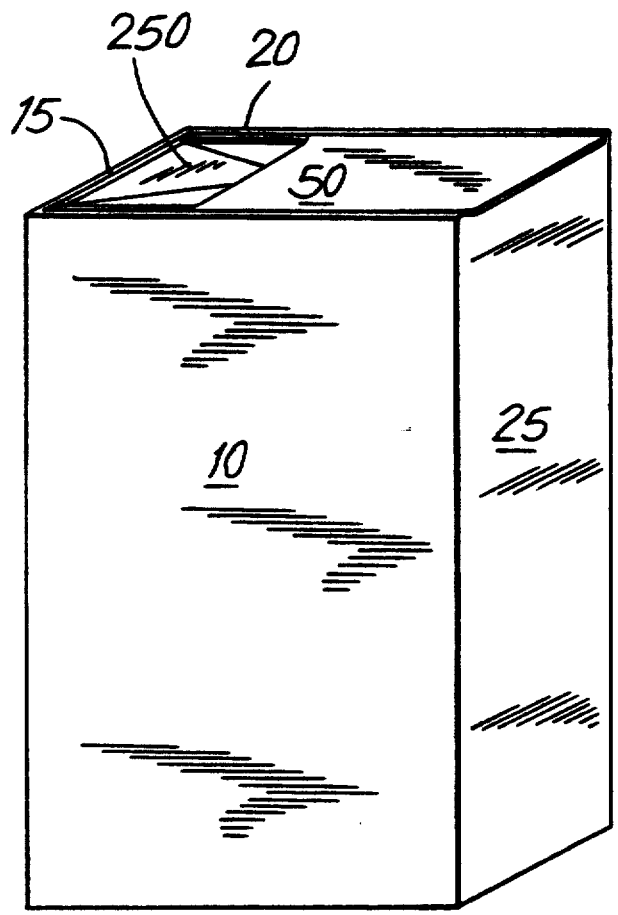
FIG. 8 is a front perspective view of the formed reusable hard pack of FIGS. 6–7 containing a foil or soft pack, and with the top closure completely closed.

When the top closure is fully closed, as shown in FIG. 8, insert portion 60 is parallel to and abutted against front wall 10 and the adjacent wall of encased pack. Top wall 50 is perpendicular to front wall 10, interior wall 20, rear wall 30, and insert portion 60, and is parallel to top 250 of the encased pack.

While FIGS. 7-8 show the level of top 250 of the encased pack set slightly below the top of the reusable hard pack, the level may be flush with the top of interior wall 20 and left side wall 15 so that when the top closure is in the completely closed position, as shown in FIG. 8, top wall 50 rests against top 250 of the encased pack.

Figure 9:
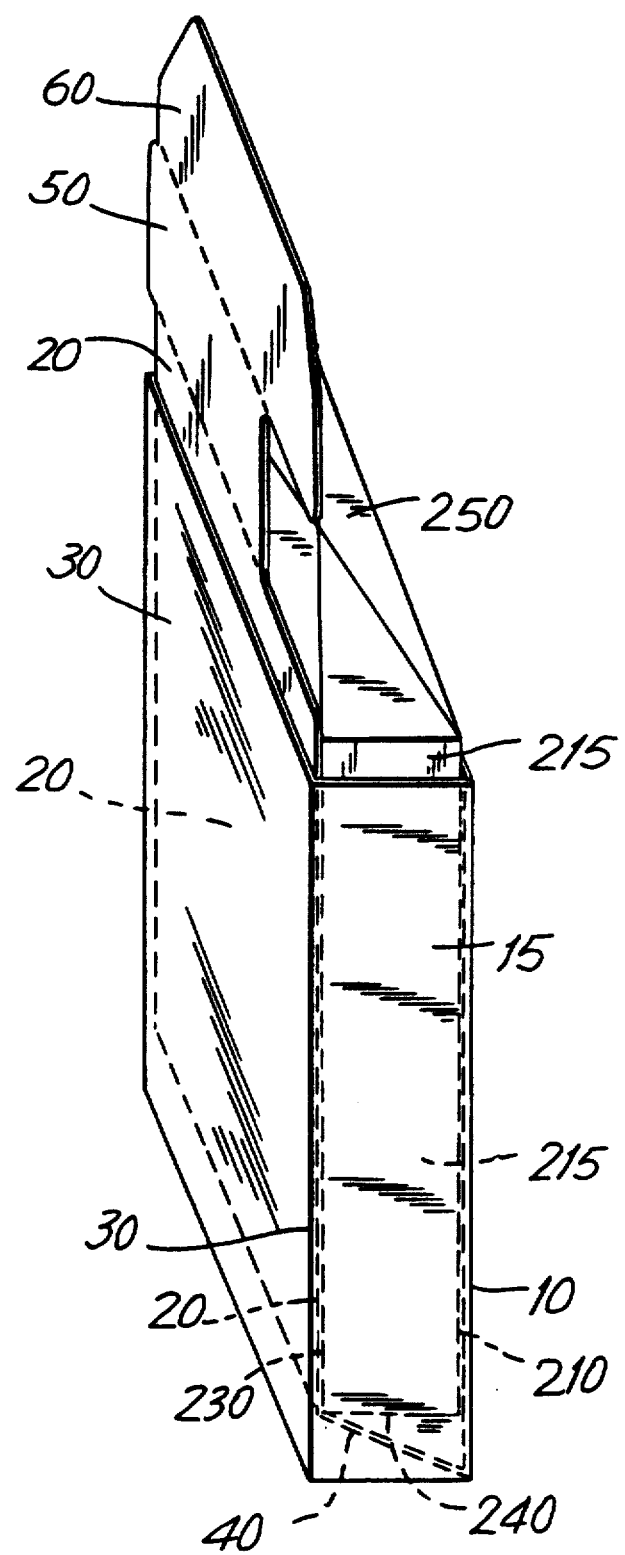
FIG. 9 is a side perspective view of the formed reusable hard pack of FIGS. 6–8 showing the various layering and positioning of the walls when the inner foil or soft pack is in the raised and accessible position and the top closure in the open position.

To facilitate ease of opening the encased foil or soft pack, the level of the encased pack may be raised relative to the reusable hard pack. This may be done, as shown in FIG. 9, by opening the top closure and pulling it in the direction opposite of bottom wall 40, thereby sliding interior wall 20 along rear wall 30 in the direction toward the top closure. This movement moves bottom wall 40 out of its perpendicular plane relative to front wall 10, interior wall 20 and rear wall 30. In particular, the angle along the pivot line between bottom wall 40 and front wall 10 becomes less than 90°, and the angle along the pivot line between bottom wall 40 and interior wall 20 becomes greater than 90°. Note that the sum of the these two angles remains 180° as long as interior wall 20 is parallel to rear wall 30.

As interior wall 20 slides upward along rear wall 30, rear 230 of the encased pack similar moves upward along with interior wall 20, creating a gap between bottom 240 of the encased pack and the portion of bottom wall 40 near front wall 10. Bottom 240 of the encased pack rests along the portion of bottom 40 near interior wall 20.

This raises top 250 of the encased pack beyond the plane defined by the adjacent free edges of front wall 10, rear wall 30, left side wall 15 and right side wall 25, exposing a portion of left side 215, front 210 and rear 230 of the encased pack. This allows the consumer to more easily tear open the wrapping of the encased pack and remove an enclosed cigarette.

Interior wall 20 moves away from rear wall 30 as interior wall 20 is moved toward the raised position. Interior wall 20 either remains parallel to rear wall 30, in which case there is a gap between it and rear wall 30, or is angled relative to rear wall 30 such that there is a gap between the portions of interior wall 20 and rear wall 30 adjacent to bottom wall 10, and the portions of interior wall 20 and rear wall 30 adjacent to top wall 50 are touching each other.

Figure 10:
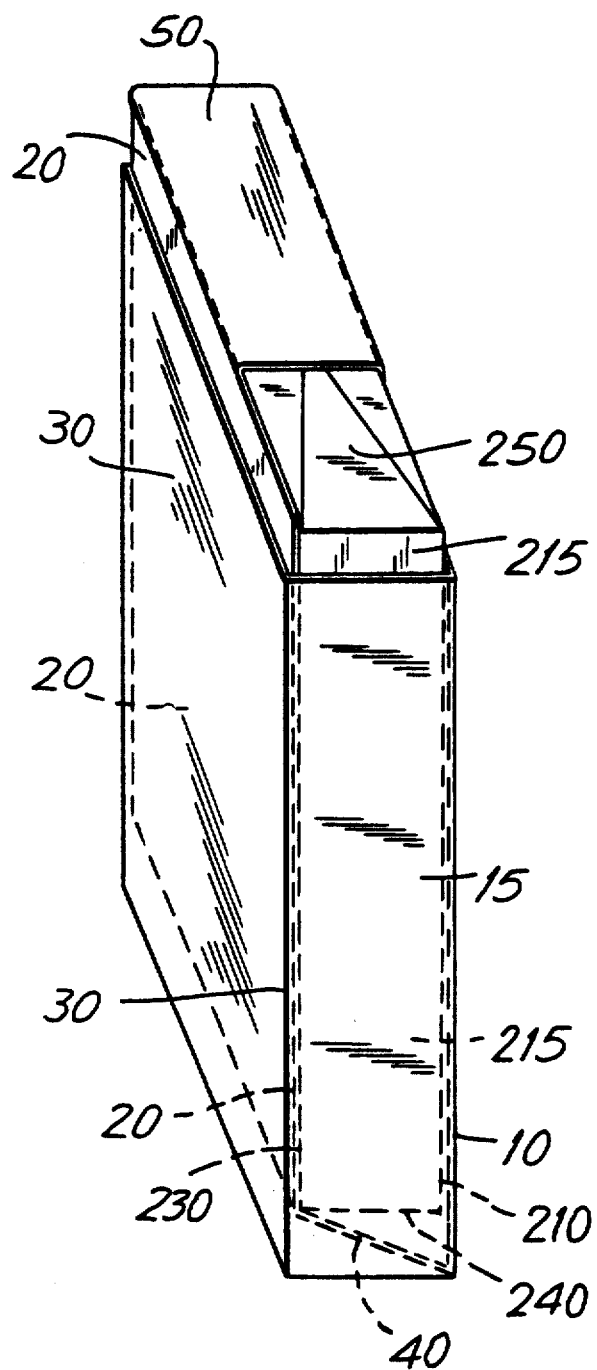
FIG. 10 is a side perspective view of the formed reusable hard pack of FIGS. 6–9 showing the various layering and positioning of the walls when the inner foil or soft pack is in the raised and accessible position and the top closure in the closed position.

Similarly, the consumer may attain the same raised position by pushing bottom wall 40 upward, in the direction toward the top closure. This may be done with the top closure in the closed position, as shown in FIG. 10. Top wall 50 remains perpendicular to interior wall 20 and tuck portion 60, which remains between the exterior surface of front 210 of the encased pack and the interior surface of front wall 10.

Figure 11:
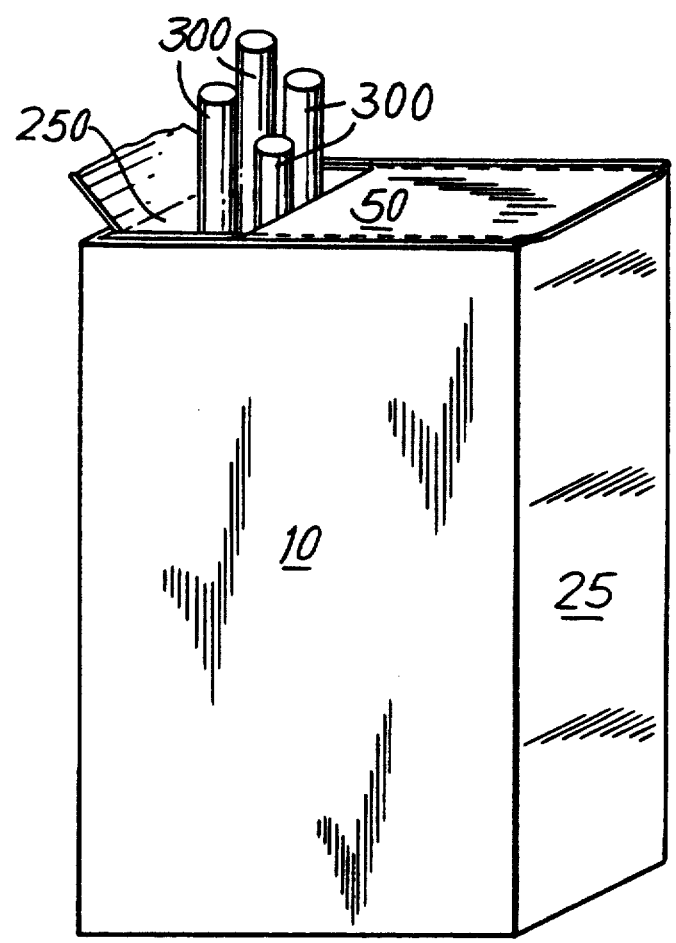
FIG. 11 is a front perspective view of the formed reusable hard pack of FIGS. 6–10 with the inner foil or soft pack opened and cigarettes extending upward through the gap in the top wall of the top closure.

While interior wall 20 may slide upward relative to rear wall 30, the lip or overhang of top wall 50 prevents interior wall 20 from sliding downward such that bottom wall 40 extends beyond the plane defined by the adjacent free edges of front wall 10, left side wall 15, right side wall 25 and rear wall 30. The top wall comprises an overhang portion which extends across and beyond one of the planes defined by the right side wall and the left side wall. The lip or overhang of top wall 50, as shown in FIGS. 8 and 11, extends over the adjacent free edge of right side wall 25. This lip or overhang is preferably about 1/16th of an inch (plus or minus 1/32nd of an inch).

Another feature that facilitates easy access to and removal of cigarettes is the gap in top wall 50 adjacent to left side wall 15, as shown in FIG. 11. This feature permits the consumer to remove cigarettes 300 without opening the top closure.

The combination of this feature with the above-described raised position greatly increases the ease in removing cigarettes 300. In particular, the consumer may push bottom wall 40 upward leaving the top closure in the closed position, as shown in FIG. 10, allowing access to the area around the corner where top 250 and left side 215 of the encased pack meet. The consumer thus may more easily grab one of cigarettes 300 and remove it from the reusable hard pack.

The preferred embodiment may optionally include means for closing the gap in top wall 50, such as shown by gap top wall 70 and gap tuck portion 80 in FIGS.

12-13. The blank in FIG. 12 is the same as the blank in FIG. 1 except for the inclusion of gap top wall 70 (which is pivotably attached to top wall 50) and gap tuck portion 80 (which is pivotably attached to gap top wall 70).

Figure 12:
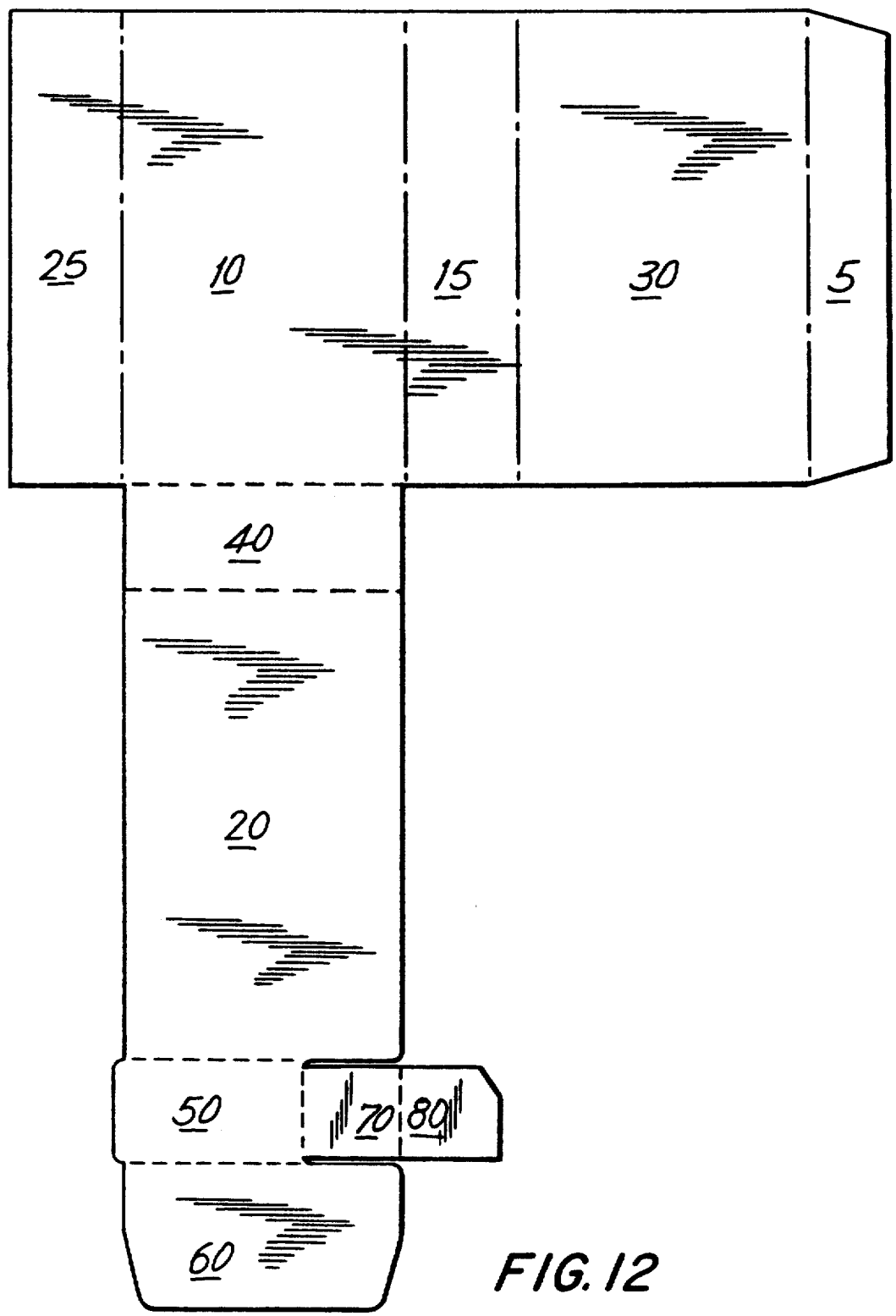
FIG. 12 shows a blank for an alternate embodiment of the invention, with the interior surface facing upward.
Figure 13:
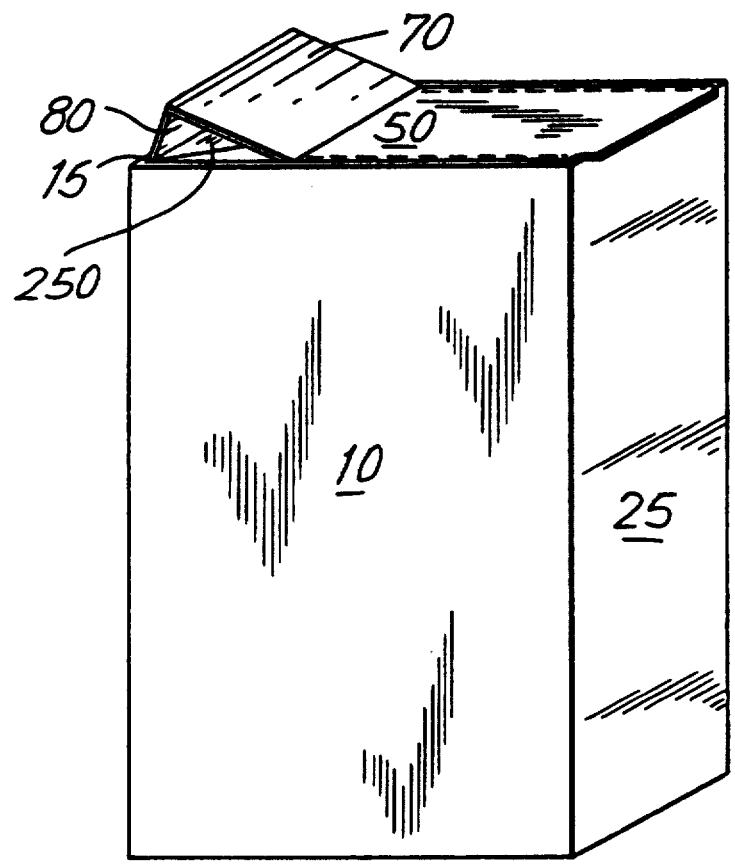
FIG. 13 is a front perspective view of the formed reuseable hard pack formed from the blank of FIG. 12.

The blank shown in FIG. 12 is formed into the three-dimensional configuration using the same method as described above and as shown in FIGS. 2-8. FIG. 13 shows the additional step of inserting gap tuck portion 80 into the reuseable hard pack between the encased soft or foil pack and left side wall 15.

The consumer may then gain access to the cigarettes in two ways: by removing gap tuck portion 80 and pivoting back gap top wall 70 to expose the cigarettes through the resulting gap, or by removing tuck portion 60 and pivoting back top wall 50 to expose the entire encased soft or foil cigarette pack. When tuck portion 60 and top wall 50 are opened, gap top wall 70 remains coplanar with top wall 50, and gap tuck portion 80 is thereby removed from between the encased cigarettes and left side wall 15.

It will be apparent that minor modifications to the manner in which the reusable hard pack is fabricated, packaged for tax-stamping and later distribution to retailers, and formed by the consumer, may be made.

For example, the steps described as performed by the consumer may be done by the retailer, or earlier in the distribution chain. The reusable hard pack may be formed and a foil or soft pack inserted prior to tax-stamping by folding top wall 50 and tuck portion 60 along and abutted against the exterior surface of rear wall 30, then inserted into a standard ten-pack carton along with nine other foil or soft packs. Alternately, top wall 50 and tuck portion 60 may be folded along and abutted against the interior surface of rear wall 30, between rear wall 30 and rear 230 of the encased foil or soft pack. Either configuration would allow the encased foil or soft pack to be exposed and tax stamped by a standard tax-stamping machine. The foil or soft packs are preferably inserted into the reuseable hard pack upside down so that the bottom of the foil or soft pack receives the tax stamp.

While the preferred embodiment suggests placing the reusable hard pack in a standard ten-pack carton, non-standard cartons may also be used. For example, a detachable dual half-carton may be used, with the reusable hard pack being inserted into one or both half-carton sections. Or a carton may encase eight or twelve cigarette packs instead of ten, or any other number of packs.

Alternately, the reusable hard pack may be designed so that the side wall and insert side wall are secured on the opposite side of the pack relative to the position of the top closure. This would be accomplished by folding the blank shown in FIG. 1 (or the blank shown in FIG. 12) in the opposite direction, that is, such that the surface of the panels shown become the interior surface of the pack instead of the exterior surface, as shown in the drawings and described above. Whereas in the preferred embodiment right side wall 25 and insert side wall 5 are positioned on the right side of the pack when facing front wall 10 with the top closure at the top of the pack, they would be positioned on the left side of the pack in the alternate embodiment when viewed with front wall 10 with the top closure at the top of the pack.

Similarly, the relative position of top wall 50 may be changed, such that the gap at the side of top wall 50 between tuck portion 60 and interior wall 20 (or gap top wall 70 and gap tuck portion 80) is on the opposite side. In this configuration, the lip or overhang of top wall 50 would extend over the adjacent free edge of left wall 15 instead of right wall 25.

As described herein and in the claims that follow, the phrase "foldably attached to" shall mean that the two walls or panels are made from contiguous portions of the blank, and scored or otherwise made foldably such that once folded into the final three-dimensional configuration, the angle between the two walls or panels, which is preferably 90°, need not be changed through the life of the reusable hard pack.

As described herein and in the claims that follow, the phrase "pivotably attached to" shall mean that the two walls or panels are made from contiguous portions of the same blank, and heavily scored or otherwise made pivotable such that the angle between the two walls or panels may and are expected to be repeatedly changed throughout the life of the reusable hard pack.

As described herein and in the claims that follow, the phrase "connected to" shall mean that the two walls or panels are either "foldably attached to" each other, as defined above, or are made from non-contiguous portions of the same blank and are secured to each other by any securing means well known in the art, such as by tape, sticker, or an extension tab or panel extending from one wall or panel and glued to the other wall or panel.

One skilled in the art will appreciate that the present invention may be practiced by other than the described embodiments, which are presented for purposes of illustration and not of limitation, and the present invention is limited only by the claims that follow.

What is claimed is:

1. A reusable hard pack for encasing cigarettes comprising:
    a front wall;
    a first side wall perpendicularly connected to the front wall;
    a second side wall perpendicularly connected to the front wall and opposite and parallel to the first side wall;
    a rear wall perpendicularly connected to each of the first and second side walls opposite and parallel to the front wall;
    a bottom wall pivotably attached to the front wall;
    an interior wall pivotably attached to the bottom wall opposite the front wall; and
    a top wall pivotably attached to the interior wall opposite the bottom wall;
    wherein the interior wall is movable along the interior surface of the rear wall when the bottom wall is pivoted toward the top wall such that the angle between the bottom wall and the front wall is less than 90°; and
    wherein the top wall is capable of a closed position in which it is perpendicular to each of the front wall, rear wall, and left and right side walls, and in which the top wall further comprises an overhang portion that extends across and beyond one of the planes defined by the first side wall and the second side wall.

2. The reusable hard pack of claim 1 wherein the reusable hard pack is made of paperboard.

3. The reusable hard pack of claim 1 wherein the reusable hard pack further comprises a tuck portion pivotably attached to the top wall opposite the interior wall such that when the top wall is in the closed position, the tuck portion may be inserted into the reusable hard pack parallel to and abutted against the front wall.

4. The reusable hard pack of claim 3 wherein the first side wall is foldably attached to the front wall.

5. The reusable hard pack of claim 4 wherein the rear wall is foldably attached to the first side wall opposite the front wall.

6. The reusable hard pack of claim 5 wherein the second side wall is foldably attached to the front wall opposite the first side wall.

7. The reusable hard pack of claim 6 wherein the reusable hard pack further comprises an insert side wall foldably attached to the rear wall opposite the first side wall and secured to the second side wall.

8. The reusable hard pack of claim 7 wherein the insert side wall is secured to the second side wall by glue.

9. The reusable hard pack of claim 7 wherein when the top wall is in the closed position it extends from the side of the top wall adjacent to the second side wall partially toward the first side wall, leaving a gap between the top wall and the first side wall.

10. The reusable hard pack of claim 9 wherein the length of the gap along the plane defined by the top wall, in the dimension parallel to the front wall, is greater than one-quarter and less than five-twelfths of the shortest distance between the first and second side walls.

11. The reusable hard pack of claim 9 wherein the reusable hard pack further comprises a gap top wall pivotably attached to the top wall along the edge of the top wall that is remote from the second side wall.

12. The reusable hard pack of claim 11 wherein the reusable hard pack further comprises a gap tuck portion pivotably attached to the gap top wall opposite the top wall.

13. The reusable hard pack of claim 7 wherein, when the top wall is in the closed position, the top wall extends from the side of the top wall adjacent to the first side wall partially toward the second side wall, leaving a gap between the top wall and the second side wall.

14. The reusable hard pack of claim 13 wherein the length of the gap along the plane defined by the top wall, in the dimension parallel to the front wall, is greater than one-quarter and less than five-twelfths of the shortest distance between the first and second side walls.

15. The reusable hard pack of claim 13 wherein the reusable hard pack further comprises a gap top wall pivotably attached to the top wall along the edge of the top wall that is remote from the second side wall.

16. The reusable hard pack of claim 15 wherein the reusable hard pack further comprises a gap tuck portion pivotably attached to the gap top wall opposite the top wall.

17. The reusable hard pack of claim 1 wherein, when the top wall is in the closed position, the top wall includes exactly one overhang portion that extends across and beyond the plane defined by the first side wall.

18. The reusable hard pack of claim 17 wherein, when the top wall is in the closed position, the length of the shortest dimension across the overhang portion is greater than 1/32 inch and less than 3/32 inch.

19. The reusable hard pack of claim 18 wherein the length of the gap along the plane defined by the top wall, in the dimension parallel to the front wall, is greater than one-quarter and less than five-twelfths of the shortest distance between the first and second side walls.

20. The reusable hard pack of claim 17 wherein, when the top wall is in the closed position, it extends from the side of the top wall adjacent to the first side wall partially toward the second side wall, leaving a gap between the top wall and the second side wall.

21. The reusable hard pack of claim 20 wherein the reusable hard pack further comprises a tuck portion pivotably attached to the top wall opposite the interior wall such that when the top wall is in the closed position, the tuck portion may be inserted into the reusable hard pack parallel to and abutted against the front wall.

22. The reusable hard pack of claim 20 wherein the reusable hard pack further comprises a gap top wall pivotably attached to the top wall along the edge of the top wall that is remote from the second side wall.

23. The reusable hard pack of claim 22 wherein the reusable hard pack further comprises a gap tuck portion pivotably attached to the gap top wall opposite the top wall.

24. The reusable hard pack of claim 20 wherein the first side wall is foldably attached to the front wall.

25. The reusable hard pack of claim 24 wherein the rear wall is foldably attached to the first side wall opposite the front wall.

26. The reusable hard pack of claim 25 wherein the second side wall is foldably attached to the front wall opposite the first side wall.

27. The reusable hard pack of claim 26 wherein the reusable hard pack further comprises an insert side wall foldably attached to the rear wall opposite the first side wall and secured to the second side wall.

28. The reusable hard pack of claim 27 wherein the insert side wall is secured to the second side wall by glue.

29. The reusable hard pack of claim 27 wherein the reusable hard pack further comprises a tuck portion pivotably attached to the top wall opposite the interior wall such that when the top wall is in the closed position, the tuck portion may be inserted into the reusable hard pack parallel to and abutted against the front wall.

30. The reusable hard pack of claim 1 wherein, when the top wall is in the closed position, the top wall includes exactly one overhang portion that extends across and beyond the plane defined by the second side wall.

31. The reusable hard pack of claim 30 wherein, when the top wall is in the closed position, the length of the shortest dimension across the overhang portion is greater than 1/32 inch and less than 3/32 inch.

32. The reusable hard pack of claim 31 wherein the length of the gap along the plane defined by the top wall, in the dimension parallel to the front wall, is greater than one-quarter and less than five-twelfths of the shortest distance between the first and second side walls.

33. The reusable hard pack of claim 30 wherein when the top wall is in the closed position it extends from the side of the top wall adjacent to the second side wall partially toward the first side wall, leaving a gap between the top wall and the first side wall.

34. The reusable hard pack of claim 33 wherein the reusable hard pack further comprises a tuck portion pivotably attached to the top wall opposite the interior wall such that when the top wall is in the closed position, the tuck portion may be inserted into the reusable hard pack parallel to and abutted against the front wall.

35. The reusable hard pack of claim 33 wherein the reusable hard pack further comprises a gap top wall pivotably attached to the top wall along the edge of the top wall that is remote from the second side wall.

36. The reusable hard pack of claim 35 wherein the reusable hard pack further comprises a gap tuck portion pivotably attached to the gap top wall opposite the top wall.

37. The reusable hard pack of claim 33 wherein the first side wall is foldably attached to the front wall.

38. The reusable hard pack of claim 37 wherein the rear wall is foldably attached to the first side wall opposite the front wall.

39. The reusable hard pack of claim 38 wherein the second side wall is foldably attached to the front wall opposite the first side wall.

40. The reusable hard pack of claim 39 wherein the reusable hard pack further comprises an insert side wall foldably attached to the rear wall opposite the first side wall and secured to the second side wall.

41. The reusable hard pack of claim 40 wherein the insert side wall is secured to the second side wall by glue.

42. The reusable hard pack of claim 40 wherein the reusable hard pack further comprises a tuck portion pivotably attached to the top wall opposite the interior wall such that when the top wall is in the closed position, the tuck portion may be inserted into the reusable hard pack parallel to and abutted against the front wall.

43. A blank for forming a reusable hard pack for encasing cigarettes comprising:
   a front wall panel;
   a right side wall panel foldably attached to the front wall;
   a left side wall panel foldably attached to the front wall panel opposite, and substantially the same size and shape as, the right side wall panel;
   a rear wall panel foldably attached to the left side wall panel opposite, and substantially the same size and shape as, the front wall panel;
   a bottom wall panel pivotably attached to the front wall panel;
   an interior wall panel pivotably attached to the bottom wall panel opposite the front wall panel;
   a top wall panel pivotably attached to the interior wall panel opposite the bottom wall panel; and
   a tuck portion panel pivotably attached to the top wall panel opposite the interior wall panel;
   the blank when folded into a three-dimensional configuration defines:
   the right side wall panel is secured to an perpendicular to the rear wall,
   the left side wall panel is perpendicular to the front wall panel and rear wall panel,
   the bottom wall panel is perpendicular to the front wall panel, the rear wall panel, the right side wall panel, the left side wall panel and the interior wall panel,
   the interior wall panel is parallel to and abutted against the rear wall panel,
   the top wall panel is perpendicular to the interior wall panel,
   the tuck portion panel is perpendicular to the top wall panel and parallel to and abutted against the interior surface of the front wall panel; and
   the top wall panel extends across and beyond one of the planes defined by the right and left side wall panels.

44. The blank according to claim 43 wherein the blank is made of paperboard.

45. The blank according to claim 43 wherein, when the blank is formed into the three-dimensional configuration, the top wall panel extends across and beyond at least one of the planes defined by the right and left side wall panels by more than 1/32 inch (0.8 mm) and less than 3/32 inch (2.4 mm).

46. The blank according to claim 43 wherein, when the blank is formed into the three-dimensional configuration, the top wall panel extends across and beyond exactly one of the planes defined by the right and left side wall panels, and the distance across the top wall panel from its edge that extends across and beyond the exactly one of the planes defined by the right and left side wall panels to the opposite edge of the top wall panel is less than the shortest distance between the right and left side wall panels.

47. The blank according to claim 46 wherein, when the blank is formed into the three-dimensional configuration, the distance across the top wall panel from its edge that extends across and beyond the exactly one of the planes defined by the right and left side wall panels to the opposite edge of the top wall panel is greater than seven-twelfths (7/12) and less than three-fourths (¾) of the shortest distance between the right and left side wall panels.

48. The blank according to claim 47 wherein, when the blank is formed into the three-dimensional configuration, the top wall panel extends across and beyond exactly one of the planes defined by the right and left side wall panels by more than 1/32 inch (0.8 mm) and less than 3/32 inch (2.4 mm).

49. The blank according to claim 46 wherein the blank further comprises a gap top wall panel pivotably attached to the top wall panel such that when the blank is in the three-dimensional configuration the gap top wall panel is opposite the edge of the top wall panel the extends across and beyond exactly one of the planes defined by the left and right side wall panels.

50. The blank according to claim 49 wherein the blank further comprises a gap tuck portion panel pivotably attached to the gap top wall panel opposite the top wall panel.

51. The blank according to claim 43 wherein the blank further comprises an insert side wall panel foldably attached to the rear wall panel opposite the left side wall panel such that the insert side wall may be secured to the right side wall panel.

52. The blank according to claim 51 wherein, when the blank is formed into the three-dimensional configuration, the top wall panel extends across and beyond exactly one of the planes defined by the right and left side wall panels, and the distance across the top wall panel from its edge that extends across and beyond the exactly one of the planes defined by the right and left side wall panels to the opposite edge of the top wall panel is less than the shortest distance between the right and left side wall panels.

53. The blank according to claim 52 wherein, when the blank is formed into the three-dimensional configuration, the top wall panel extends across and beyond the exactly one of the planes defined by the right and left side wall panels by more than 1/32 inch (0.8 mm) and less than 3/32 inch (2.4 mm).

54. The blank according to claim 52 wherein, when the blank is formed into the three-dimensional configuration, the distance across the top wall panel from its edge that extends across and beyond the exactly one of the planes defined by the right and left side wall panels to the opposite edge of the top wall panel is greater than seven-twelfths (7/12) and less than three-fourths (¾) of the shortest distance between the right and left side wall panels.

55. The blank according to claim 54 wherein, when the blank is formed into the three-dimensional configuration, the top wall panel extends across and beyond the exactly one of the planes defined by the right and left side wall panels by more than 1/32 inch (0.8 mm) and less than 3/32 inch (2.4 mm).

56. A collapsed, reusable hard pack for encasing cigarettes and configured to be inserted in a cigarette carton without obstructing a tax-stamping process, comprising a first, second and third layer;
wherein the first layer further comprises:
a front wall; and
a first side wall foldably attached to and coplanar with the front wall;
wherein the second layer further comprises:
a bottom wall pivotably attached to and abutted against the front wall;
an interior wall pivotably attached to the bottom wall opposite the front wall, and coplanar with the bottom wall; and
a top wall pivotably attached to the interior wall opposite the bottom wall, and coplanar with the interior wall; and
wherein the third layer further comprises:
a second side wall foldably attached to the front wall opposite the first side wall, and abutted against the surface of the interior wall opposite the front wall; and
a rear wall foldably attached to the second side wall opposite the front wall, coplanar with the second side wall, and foldably connected to the first side wall;
wherein the shortest distance across the first layer and the shortest distance across the third layer are each less than the length of a line along which the front wall and the first side wall are pivotably attached;
the collapsed, reusable hard pack when folded into a three-dimensional configuration defines:
the front and rear walls are each perpendicular to each of the first and second side walls;
the bottom wall is perpendicular to each of the front, rear, first side and second side walls;
the interior wall is perpendicular to the bottom wall and parallel to and abutted against the rear wall; and
the top wall in a closed position is pivoted so that it is perpendicular to each of the interior, front rear, first side and second side walls, and extends across and beyond one of the planes defined by the first and second side walls.

57. The collapsed, reusable hard pack of claim 56 wherein the collapsed, reusable hard pack is made of paperboard.

58. The collapsed, reusable hard pack of claim 56 wherein, when the top wall is in the closed position, the top wall extends across and beyond exactly one of the planes defined by the first and second side walls.

59. The collapsed, reusable hard pack of claim 58 wherein, when the top wall is in the closed position, the top wall extends across and beyond exactly one of the planes defined by the first and second side walls by a distance of greater than 1/32 inch and less than 3/32 inch.

60. The collapsed, reusable hard pack of claim 58 wherein, when the top wall is in the closed position, the top wall extends across and beyond the plane defined by the first side wall.

61. The collapsed, reusable hard pack of claim 60 wherein, when the top wall is in the closed position, the top wall extends across and beyond the plane defined by the first side wall by a distance of greater than 1/32 inch and less than 3/32 inch.

62. The collapsed, reusable hard pack of claim 58 wherein, when the top wall is in the closed position, the top wall extends across and beyond the plane defined by the second side wall.

63. The collapsed, reusable hard pack of claim 62 wherein, when the top wall is in the closed position, the top wall extends across and beyond the plane defined by the first side wall by a distance of greater than 1/32 inch and less than 3/32 inch.

64. The collapsed, reusable hard pack of claim 56 wherein, when the top wall is in the closed position, the length of a line across the top wall that a parallel to the front wall is less than the shortest distance between the first and second side walls.

65. The collapsed, reusable hard pack of claim 64 wherein, when the top wall is in the closed position, the length of the line across the top wall that is parallel to the front wall is greater than seven-twelfths (7/12) and less than three-fourths (¾) of the shortest distance between the first and second side walls.

66. The collapsed, reusable hard pack of claim 64 wherein, when the top wall is in the closed position, the top wall extends across and beyond exactly one of the planes defined by the first and second side walls.

67. The collapsed, reusable hard pack of claim 66 wherein, when the top wall is in the closed position, the top wall extends across and beyond exactly one of the planes defined by the first and second side walls by a distance of greater than 1/32 inch and less than 3/32 inch.

68. The collapsed, reusable hard pack of claim 56 wherein the second layer further comprises an insert side wall foldably attached to the rear wall opposite the second side wall, folded parallel to and abutted against the rear wall, and parallel to, abutted against and secured to the first side wall.

69. The collapsed, reusable hard pack of claim 68 wherein the insert side wall is secured to the second side wall by glue.

70. The collapsed, reusable hard pack of claim 68 wherein, when the top wall is in the closed position, the top wall extends across and beyond exactly one of the planes defined by the first and second side walls.

71. The collapsed, reusable hard pack of claim 70 wherein, when the top wall is in the closed position, the length of a line across the top wall that a parallel to the front wall is less than the shortest distance between the first and second side walls.

72. The collapsed, reusable hard pack of claim 71 wherein, when the top wall is in the closed position, the top wall extends across and beyond exactly one of the planes defined by the first and second side walls by a distance of greater than 1/32 inch and less than 3/32 inch.

73. The collapsed, reusable hard pack of claim 72 wherein, when the top wall is in the closed position, the length of the line across the top wall that is parallel to the front wall is greater than seven-twelfths (7/12) and less than three-fourths (¾) of the shortest distance between the first and second side walls.

74. The collapsed, reusable hard pack of claim 71 wherein the reusable hard pack further comprises a gap top wall pivotably attached to the top wall opposite the edge of the top wall that extends across and beyond one of the planes defined by the first and second side walls when the top wall is in the closed position.

75. The collapsed, reusable hard pack of claim 74 wherein the reusable hard pack further comprises a gap tuck portion pivotably attached to the gap top wall opposite the top wall.

* * * * *